(12) United States Patent
Byrne et al.

(10) Patent No.: US 11,606,485 B2
(45) Date of Patent: *Mar. 14, 2023

(54) VEHICULAR CAMERA WITH CONTROLLED CAMERA FOCUS

(71) Applicant: Magna Electronics Inc., Auburn Hills, MI (US)

(72) Inventors: Steven V. Byrne, Goodrich, MI (US); Rene Dreiocker, Rochester Hills, MI (US); Stefan Sauer, Waldaschaff (DE); Yuesheng Lu, Farmington Hills, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/649,371

(22) Filed: Jan. 31, 2022

(65) Prior Publication Data

US 2022/0159161 A1 May 19, 2022

Related U.S. Application Data

(63) Continuation of application No. 16/946,516, filed on Jun. 25, 2020, now Pat. No. 11,240,411.

(60) Provisional application No. 62/866,662, filed on Jun. 26, 2019.

(51) Int. Cl.
*H04N 5/225* (2006.01)
*B60R 1/00* (2022.01)

(52) U.S. Cl.
CPC ....... *H04N 5/22521* (2018.08); *H04N 5/2252* (2013.01); *H04N 5/2253* (2013.01); *H04N 5/2254* (2013.01); *B60R 1/00* (2013.01); *B60R 2300/105* (2013.01); *H04N 5/2257* (2013.01)

(58) Field of Classification Search
None
See application file for complete search history.

(56) References Cited

U.S. PATENT DOCUMENTS

| | | |
|---|---|---|
| 5,412,510 A | 5/1995 | Iizuka et al. |
| 5,550,677 A | 8/1996 | Schofield et al. |
| 5,670,935 A | 9/1997 | Schofield et al. |
| 5,949,331 A | 9/1999 | Schofield et al. |
| 5,978,017 A | 11/1999 | Tino |
| 6,151,065 A | 11/2000 | Steed et al. |
| 7,595,943 B2 | 9/2009 | Yuan |

(Continued)

*Primary Examiner* — Mohammed Jebari
(74) *Attorney, Agent, or Firm* — Honigman LLP

(57) ABSTRACT

A vehicular camera includes a camera housing having front and rear camera housing portions. An imager is disposed at a printed circuit board. A lens assembly is disposed at the front camera housing portion and accommodates at least one lens. The front camera housing portion is formed of a material having a first Coefficient of Thermal Expansion (CTE). At least two attachment elements are disposed at the front camera housing portion and are formed of a material having a second CTE that is less than the first CTE of the front camera housing portion and that is less than 10 ppm/° C. The printed circuit board is mounted at the attachment elements via fasteners threadedly engaging respective ones of the at least two attachment elements. The front camera housing portion and the attachment elements cooperate to decrease temperature-induced movement of the printed circuit board relative to the at least one lens.

22 Claims, 4 Drawing Sheets

(56) References Cited

U.S. PATENT DOCUMENTS

| | | |
|---|---|---|
| 7,965,336 B2 | 6/2011 | Bingle et al. |
| 8,542,451 B2 | 9/2013 | Lu et al. |
| 8,994,878 B2 | 3/2015 | Byrne et al. |
| 9,077,098 B2 | 7/2015 | Latunski |
| 9,277,104 B2 | 3/2016 | Sesti et al. |
| 9,621,769 B2 | 4/2017 | Mai et al. |
| 10,142,532 B2 | 11/2018 | Mleczko |
| 10,207,646 B2 | 2/2019 | Oh |
| 10,230,875 B2 | 3/2019 | Mleczko et al. |
| 10,250,004 B2 | 4/2019 | Conger et al. |
| 10,272,857 B2 | 4/2019 | Conger et al. |
| 10,274,812 B1 | 4/2019 | Chen |
| 11,240,411 B2 | 2/2022 | Byrne et al. |
| 2001/0055073 A1 | 12/2001 | Shinomiya |
| 2003/0090569 A1 | 5/2003 | Poechmueller |
| 2003/0128291 A1 | 7/2003 | Harazono et al. |
| 2004/0069998 A1 | 4/2004 | Harazono |
| 2007/0098400 A1* | 5/2007 | Chen .............. H04N 5/2254 396/529 |
| 2007/0146908 A1 | 6/2007 | Li |
| 2007/0200053 A1 | 8/2007 | Nomura et al. |
| 2009/0244361 A1 | 10/2009 | Gebauer et al. |
| 2011/0025850 A1 | 2/2011 | Maekawa et al. |
| 2011/0298925 A1 | 12/2011 | Inoue et al. |
| 2012/0019940 A1 | 1/2012 | Lu et al. |
| 2013/0130937 A1 | 5/2013 | Sun et al. |
| 2013/0183499 A1 | 7/2013 | Kido et al. |
| 2013/0242099 A1 | 9/2013 | Sauer et al. |
| 2014/0298642 A1 | 10/2014 | Sesti et al. |
| 2014/0373345 A1 | 12/2014 | Steigerwald |
| 2015/0015713 A1 | 1/2015 | Wang et al. |
| 2015/0029337 A1 | 1/2015 | Uchiyama et al. |
| 2015/0124098 A1 | 5/2015 | Winden et al. |
| 2015/0222795 A1 | 8/2015 | Sauer et al. |
| 2015/0327398 A1 | 11/2015 | Achenbach et al. |
| 2015/0379361 A1 | 12/2015 | Boulanger |
| 2016/0037028 A1 | 2/2016 | Biemer |
| 2016/0191863 A1 | 6/2016 | Minikey, Jr. et al. |
| 2016/0202443 A1* | 7/2016 | Knutsson .............. B60R 11/04 348/148 |
| 2016/0243987 A1 | 8/2016 | Kendall |
| 2016/0268716 A1 | 9/2016 | Conger et al. |
| 2016/0284752 A1 | 9/2016 | Shi |
| 2016/0286103 A1 | 9/2016 | Van Dan Elzen |
| 2017/0036600 A1 | 2/2017 | Whitehead et al. |
| 2017/0054881 A1 | 2/2017 | Conger et al. |
| 2017/0126938 A1 | 5/2017 | Newiger |
| 2017/0129419 A1 | 5/2017 | Conger et al. |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2017/0302829 A1 | 10/2017 | Mleczko et al. |
| 2018/0027151 A1 | 1/2018 | Kazama et al. |
| 2018/0033741 A1 | 2/2018 | Dubey et al. |
| 2018/0042106 A1 | 2/2018 | Scheja |
| 2018/0098033 A1 | 4/2018 | Mleczko et al. |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0166289 A1 | 5/2019 | Knutsson et al. |
| 2019/0306966 A1 | 10/2019 | Byrne et al. |
| 2019/0355606 A1 | 11/2019 | Flotgen |
| 2020/0001787 A1 | 1/2020 | Lu et al. |
| 2020/0033549 A1 | 1/2020 | Liu et al. |
| 2020/0137926 A1 | 4/2020 | Wohlte |
| 2020/0154020 A1 | 5/2020 | Byrne et al. |
| 2020/0204711 A1 | 6/2020 | Guidi et al. |
| 2020/0412925 A1 | 12/2020 | Byrne et al. |

* cited by examiner

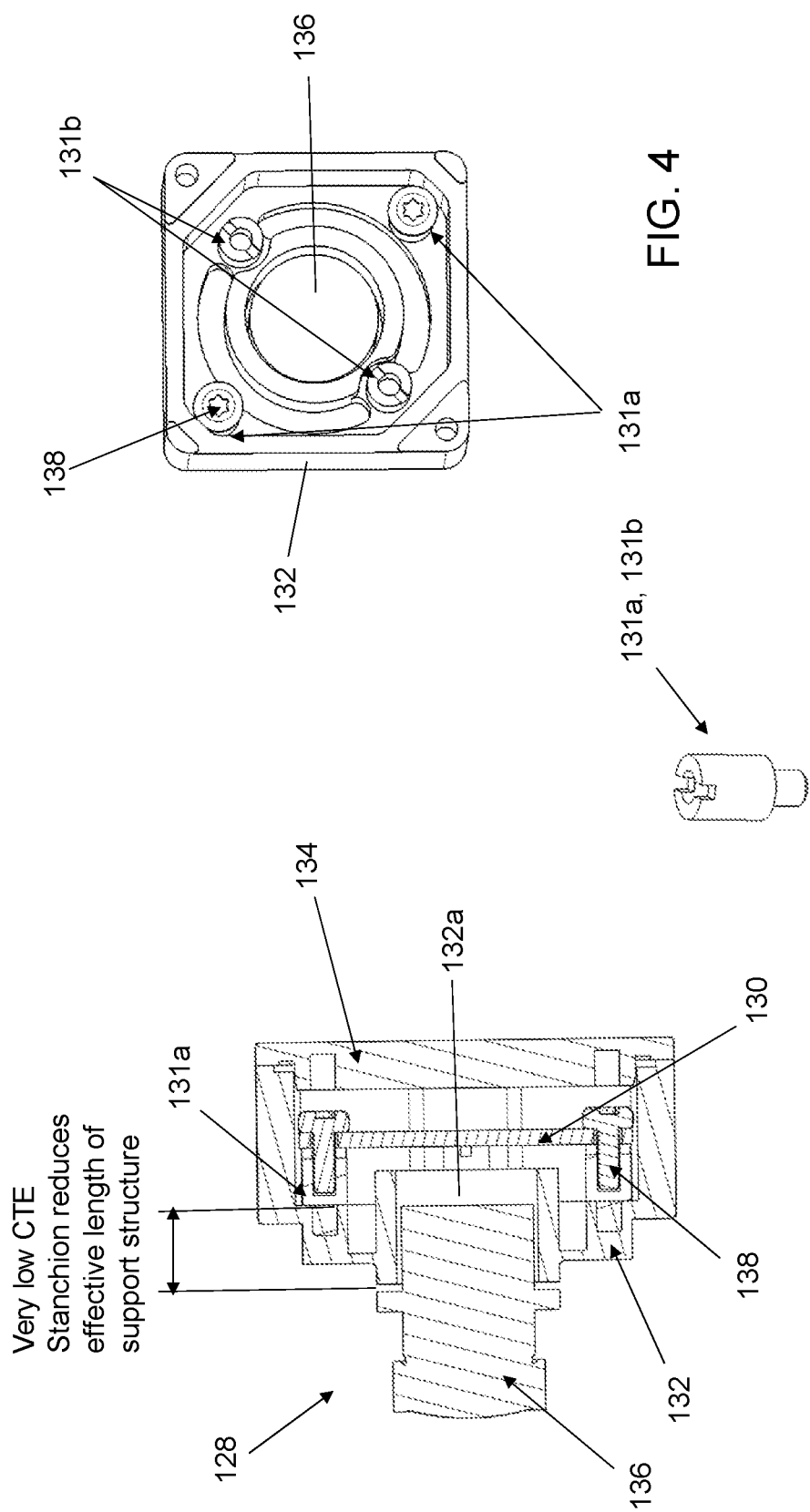

VEHICULAR CAMERA WITH CONTROLLED CAMERA FOCUS

CROSS REFERENCE TO RELATED APPLICATIONS

The present application is a continuation of U.S. patent application Ser. No. 16/946,516, filed Jun. 25, 2020, now U.S. Pat. No. 11,240,411, which claims the filing benefits of U.S. provisional application Ser. No. 62/866,662, filed Jun. 26, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras have been proposed for such imaging systems, including cameras of the types described in U.S. Pat. No. 7,965,336 and U.S. Publication No. US-2009-0244361, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides stanchions or posts or attachment elements for mounting the printed circuit board at the camera housing or lens holder, with the stanchions or posts or attachment elements comprising a material having a coefficient of thermal expansion (CTE) that is very low (such as less than about 5 ppm/° C.), and that is lower than the CTE of the housing and circuit board. When the camera is disposed at the vehicle and exposed to a high or low temperature, the stanchions or posts or attachment elements function to increase or decrease movement of the circuit board to accommodate temperature-induced movement of the lens relative to the imager to maintain focus of the lens at the imager.

These and other objects, advantages, purposes and features of the present invention will become apparent upon review of the following specification in conjunction with the drawings.

BRIEF DESCRIPTION OF THE DRAWINGS

FIG. 3 is a side view diagram of a camera having a lens and a circuit board mounted at a front camera housing portion via very low CTE stanchions or posts or attachment elements in accordance with the invention;

FIG. 4 is a perspective view of the front camera housing portion, showing the stanchions established thereat;

FIG. 5 is a perspective view of one of the stanchions;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
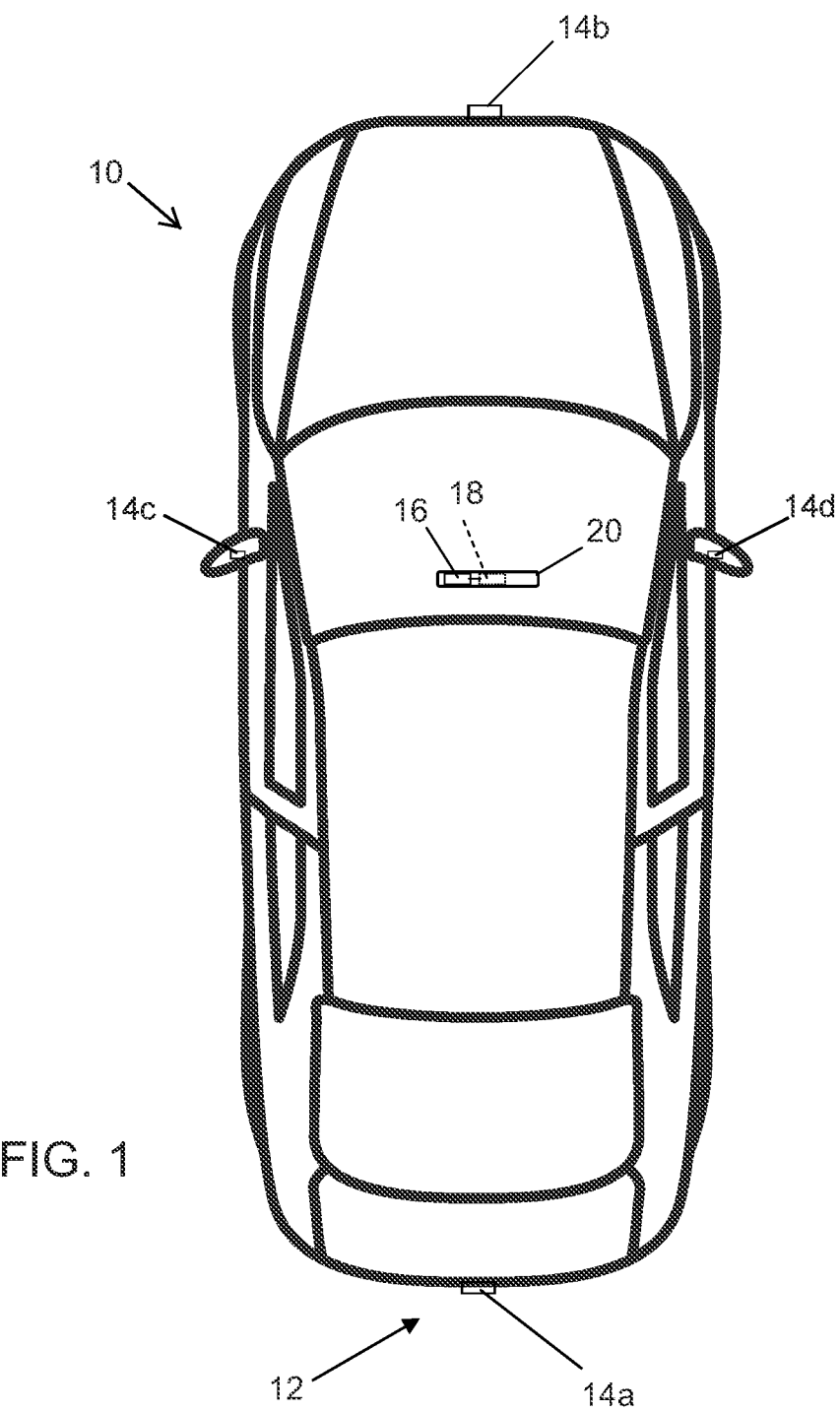
FIG. 1 is a plan view of a vehicle with a vision system that incorporates multiple cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager or imaging device of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The control unit may comprise or may be part of an autonomous vehicle control system, whereby the cameras capture image data that is processed for use in autonomously controlling the vehicle. Autonomous vehicle cameras may require very high levels of focus precision in all environments. Automotive cameras must maintain precise lens-toimager relative position throughout the full range of operating temperatures. This is challenging because of the various camera assembly material CTEs (Coefficients of Thermal Expansion). The optical performance of the lens may also be a contributor.

Simulations have been performed on the mechanical and optical design to predict changes as accurately as possible. The actual assembly will often still have a five or more microns lens-to-imager shift due to unforeseen behaviors with the components and optics. Further long-term control is often unachievable.

Figure 2:
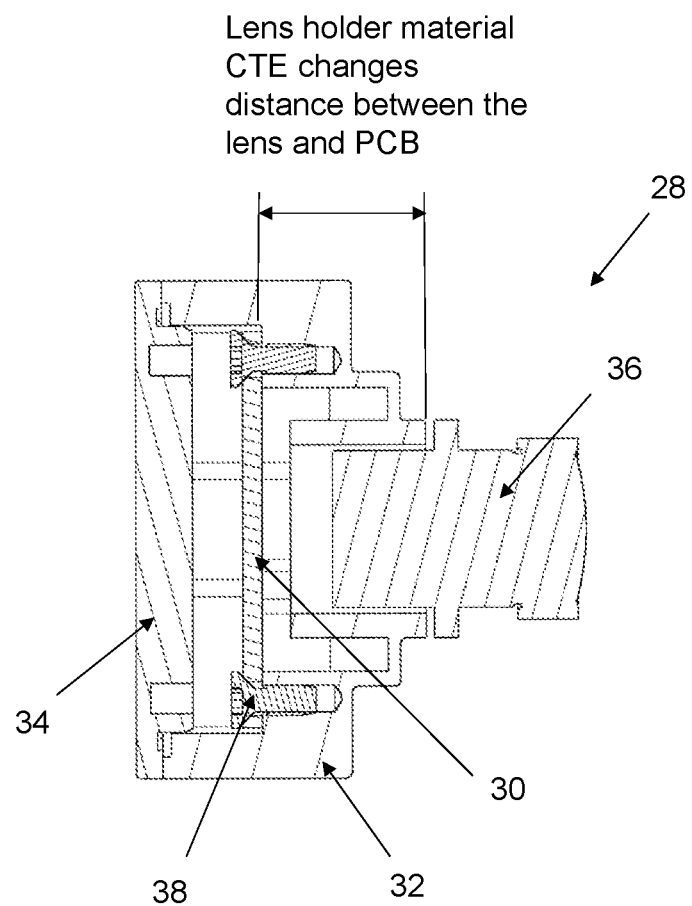
FIG. 2 is a side view diagram of a camera having a lens and a circuit board mounted at a front camera housing portion.

As shown in FIG. 2, a camera 28 has a printed circuit board (PCB) 30 attached at a front camera housing portion 32 (or lens holder), with a rear cover or camera housing portion 34 attached at or mated to the rear of the front camera housing portion (and secured and sealed thereat via fasteners and/or adhesive and/or welding and/or other securing and sealing elements) to encase or house the circuit board and circuitry within the camera housing. The PCB 30 has an imager or imaging device or the like disposed at a surface thereof (such as affixed at the surface of the PCB via solder balls or the like). A lens assembly 36 is supported at the lens holder or front camera housing portion 32. The lens assembly 36 includes at least one optic or lens element that is optically aligned with and focused at the imager when the lens assembly is bonded to the lens holder and the circuit board is fastened (such as via one or more fasteners 38) to the lens holder.

The lens holder material has a CTE that, as the lens holder expands and contracts when the camera is exposed to extreme temperatures (such as extreme high temperatures and/or extreme low temperatures) causes the lens assembly to move relative to the PCB and imager, such that the focus of the lens element at the imager changes or is not maintained.

Cameras typically experience a distance change between the lens and image sensor with temperature which effect focus. This is caused by the coefficient of thermal expansion (CTE) of materials that support these components. As shown in FIG. 2, the lens holder is the supporting structure between the lens and PCB (with the image sensor disposed at the PCB). This is a substantial problem for automotive cameras that must typically perform within ranges from −40 degrees C. to 85 degrees C.

To overcome this, the lens may be designed in a way to shift the focus plane with temperature so that it approximately matches anticipated movement of the image sensor in the camera system. However, including specific lens focal plane movement behavior in a design can negatively affect cost and/or image quality. Also, achieving a good match with actual findings (theory vs. actual) is challenging and the need to re-design after actual measurements is common. This may result in more time and money to re-adjust and re-tool portions of the lens and camera to better tune the behavior.

Figure 7:
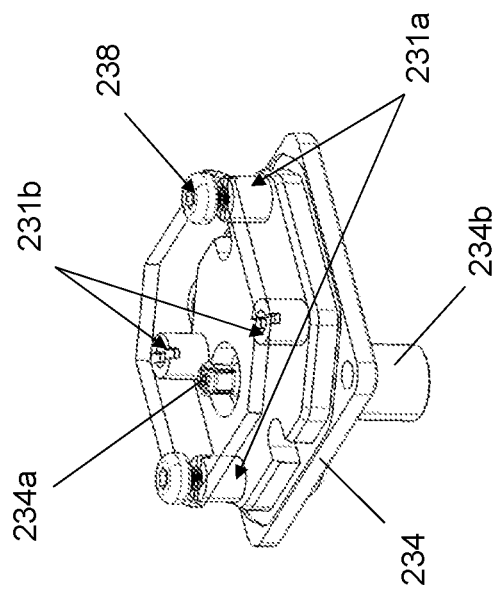
FIG. 7 is a perspective view of the rear camera housing portion, showing the stanchions established thereat.
Figure 9:
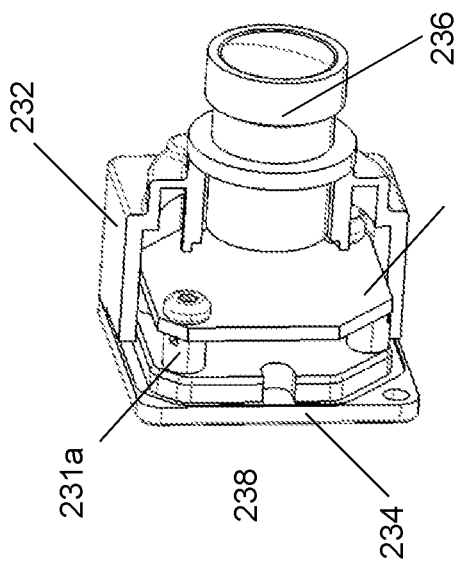
FIG. 9 is a perspective view of the camera with portions of the housing removed to show additional details.
Figure 8:
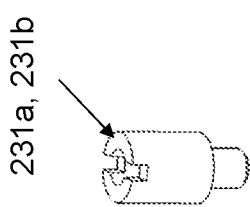
FIG. 8 is a perspective view of one of the stanchions.
Figure 6:
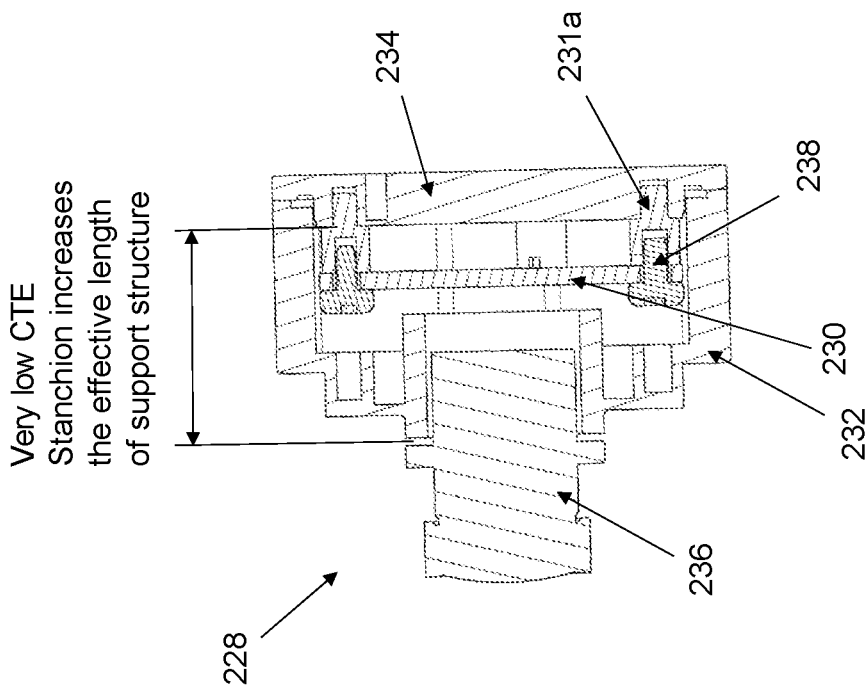
FIG. 6 is a side view diagram of another camera having a lens and a circuit board mounted at a rear camera housing portion via very low CTE stanchions in accordance with the invention.

In accordance with aspects of the present invention, the PCB may be attached at the lens holder via low CTE stanchions or posts or attachment elements to reduce the focus effect of the expansion/contraction of the lens holder and to reduce the effects of camera structure CTE movement to optimize focus over large temperature range (such as shown in FIGS. 3-5 and discussed below), or the PCB may be attached at the rear cover via low CTE stanchions to increase the focus effect of the expansion/contraction of the lens holder and to increase the effects of camera structure CTE movement to optimize focus over large temperature range (such as shown in FIGS. 6-8 and discussed below).

The stanchions or posts or attachment elements comprise a material having a very low CTE, such as less than about 10 ppm/° C. (a unit of change in the part per degree Celsius), such as less than about 5 ppm/° C., such as less than about 2 ppm/° C. (for example, the material may have a CTE as low as about 1.5 ppm/° C.). The stanchions may be formed substantially entirely of or consist substantially solely of the very low CTE material, or may comprise an alloy or compound of low CTE materials, such that the CTE of the overall stanchions is very low, such as less than about 10 ppm/° C., or less than about 5 ppm/° C., or less than about 2 ppm/° C. (for example, the stanchions may have a CTE as low as about 1.5 ppm/° C.). The very low CTE stanchions are attached or formed as part of the PCB support structure to reduce PCB movement. The stanchions may be made out of plastic, brass, aluminum or steel, but preferably are made from an iron nickel alloy, which has very low CTE value. One of these iron nickel alloy typically has 64 percent iron and 36 percent nickel. Some common names are Invar (material number 1.3912) and Kovar (also referred to as FeNi36 or 64FeNi). Some benefits to using Invar-like stanchions include a stanchion having a CTE that can be as low as 1.5 ppm/° C., a stanchion that can be machined from commonly produced bar stock, a stanchion that can be easily attached to existing structures with adhesive, a stanchion having a length that can be easily changed in the design to tune PCB movement with temperature with minimal impact to development time and cost. The length may be selected or designed based at least in part on the material of the camera housing and/or the length of the support structure portion of the camera housing (i.e., the length of the part of the camera housing between the location where the lens is attached at the front camera housing and the location where the low CTE stanchions are attached at the camera housing). Also, use of such low CTE stanchions reduces or minimizes the amount of Invar-like material used in the camera to save cost.

The stanchions can be manufactured by machining, MIM (Metal Injection Molding) or PM (Powder Metallurgy) and investment casting. The stanchions can be fixed in the lens holder and/or rear cover by screwing, gluing, pressing and/or the like. The PCB can be fixed to the stanchions by using self-tapping screws or adhesives that facilitate a focus and aligning process.

Two versions of the camera concept are shown in FIGS. 3-5 and FIGS. 6-8 to demonstrate how the very low CTE stanchions can be used to support the PCB from either side of the PCB to increase or decrease PCB movement to match lens behavior.

For example, and with reference to FIGS. 3-5, a camera 128 has a printed circuit board (PCB) 130 attached at a front camera housing portion 132 (or lens holder) via stanchions or posts or attachment elements 131a, 131b, with a rear cover or camera housing portion 134 attached at or mated to the rear of the front camera housing portion to encase or house the circuit board and circuitry within the camera housing. The PCB 130 has an imager or imaging device or the like disposed at a surface thereof (such as affixed at the surface of the PCB via solder balls or the like). The lens assembly 136 is supported at the lens holder or front camera housing portion 132. The lens assembly 136 includes at least one optic or lens element that is optically aligned with and focused at the imager when the lens assembly is bonded to the lens holder and the circuit board is fastened (such as via one or more fasteners 138) at the stanchions 131a at the lens holder.

The stanchions 131*a*, 131*b* comprise a material having a very low CTE (as discussed above) and are disposed at receiving portions of the lens holder 132 around a lens aperture or passageway 132*a* of the lens holder 132. As shown in FIG. 4, two stanchions 131*b* may be configured to support the PCB 130 thereat, with the PCB surface engaging the outer ends of the stanchions, and two other stanchions 131*a* may also support the PCB and may threadedly receive the fasteners 138 therein to secure the PCB at the stanchions 131*a*, 131*b*. As best shown in FIG. 5, each of the stanchions 131*a*, 131*b* comprises a cylindrical peg having a narrower diameter end that is received in the respective receiving portion (and press-fit or adhesively bonded or insert molded therein) of the lens holder and a larger diameter portion on which the PCB rests and in which the threaded fastener 138 is threaded to secure the PCB to the stanchions.

As shown in FIG. 3, the very low CTE stanchions or posts or attachment elements reduce the effective length of the higher CTE support structure that holds or supports the PCB relative to the lens. The higher CTE support structure is the portion of the front camera housing or lens holder that spans between the location where the lens barrel is attached at the front camera housing or lens holder and the location where the stanchions are attached at the front camera housing portion. Thus, during optical alignment and focusing of the lens relative to the imager, the PCB is spaced from the lens by the appropriate amount, with the low CTE stanchions extending from the higher CTE support structure and thus reducing the amount or length of the higher CTE support structure that supports the PCB relative to the lens.

Thus, when the camera is exposed to extreme temperatures, the higher CTE front camera housing allows temperature-induced movement of the stanchions and the PCB relative to the lens, while the low CTE stanchions (effectively taking the place of part of the front camera housing) provide reduced temperature-induced movement of the PCB relative to the front camera housing and thus relative to the lens. The combination of the effective length of the support structure of the front camera housing and the low CTE stanchions provide for reduced temperature-induced movement of the PCB relative to the lens to maintain focus of the lens at the imager when the camera is exposed to extreme temperatures. The stanchions thus reduce the effects of the higher CTE camera structure movement to optimize focus of the lens at the imager over large temperature ranges.

As shown in FIGS. 6-9, a camera 228 has a printed circuit board (PCB) 230 attached at rear cover or rear camera housing portion 234 via stanchions or posts or attachment elements 231*a*, 231*b*, with a front camera housing portion 232 attached at or mated to the front of the rear camera housing portion to encase or house the circuit board and circuitry within the camera housing (in such an application, the optical alignment and focusing of the lens at the imager may be performed during mating of the rear cover or rear camera housing portion to the lens holder or front camera housing portion, or the lens may be adjusted and aligned and focused when the lens is attached at the lens holder or front camera housing portion after the rear cover or rear camera housing portion is mated to the lens holder or front camera housing portion). The PCB 230 has an imager or imaging device or the like disposed at a surface thereof (such as affixed at the surface of the PCB via solder balls or the like). The lens assembly 236 is supported at the lens holder or front camera housing portion 232. The lens assembly 236 includes at least one optic or lens element that is optically aligned with and focused at the imager when the lens assembly is bonded to the lens holder and the circuit board is fastened (such as via one or more fasteners 238) at the lens holder.

The stanchions are disposed at the rear housing portion or cover in this embodiment if the expected movement of the PCB (when the camera is exposed to extreme temperatures) is in the opposite direction from the expected movement of the PCB in camera 128, discussed above. As best shown in FIG. 8, the stanchions 231*a*, 231*b* are similar or identical to the stanchions 131*a*, 131*b*, discussed above, and comprises a cylindrical peg having a narrower diameter end that is received in the receiving portion of the lens holder and a larger diameter portion on which the PCB rests and in which the threaded fastener 238 is threaded to secure the PCB to the stanchions. As shown in FIG. 7, two stanchions 231*b* may be configured to support the PCB thereat, with the PCB surface engaging the outer ends of the stanchions, and two other stanchions 231*a* may also support the PCB and may threadedly receive the fasteners 238 therein to secure the PCB at the stanchions 231*a*, 231*b*. As also shown in FIG. 7, with the PCB secured to the stanchions 231*a*, 231*b* at the rear cover, an electrical connector 234*a* (such as a coaxial electrical connector) electrically connects with circuitry (such as at a header connector or the like) at the rear side of the PCB to electrically connect the PCB circuitry to a connector portion 234*b* at the rear of the camera housing that is configured to electrically connect to a wire harness of the vehicle.

As shown in FIG. 6, the very low CTE stanchions or posts or attachment elements increase the effective length of the higher CTE support structure that holds or supports the PCB relative to the lens. The higher CTE support structure is the portion of the front camera housing or lens holder that spans between the location where the lens barrel is attached at the front camera housing or lens holder and the location where the stanchions are attached at the rear camera housing portion. Thus, during optical alignment and focusing of the lens relative to the imager, the PCB is spaced from the lens by the appropriate amount, with the low CTE stanchions extending from the PCB rearward toward the rear camera housing portion that is attached at the higher CTE support structure and thus increasing the amount or length of the higher CTE support structure (e.g., almost the entire length of the front camera housing) that supports the PCB relative to the lens.

Thus, the stanchions are provided at the rear housing portion to increase the effects of the higher CTE camera housing structure movement to optimize focus of the lens at the imager over large temperature ranges. When the camera is exposed to extreme temperatures, the higher CTE front camera housing allows temperature-induced movement of the stanchions and the PCB relative to the lens, while the low CTE stanchions provide reduced temperature-induced movement of the PCB relative to the rear camera housing while spacing the PCB forward from the rear camera housing toward the lens. Such a configuration may be selected when, for example, during testing it is determined that a greater amount of temperature-induced movement is desired to maintain focus and alignment of the lens relative to the imager. Because the behavior of the materials and components in extreme temperatures is difficult to predict in simulations, testing of the components and assemblies may indicate unpredicted behavior (expansion/contraction) of the assembled product in extreme temperatures. Depending on the actual PCB movement or behavior, the design of the components may be modified to implement the stanchions at either the front housing or at the rear housing or cover in order to compensate for the largest PCB movement direction. The combination of the effective length of the support structure of the front camera housing and the low CTE stanchions provide for enhanced temperature-induced movement of the PCB relative to the lens to maintain focus of the lens at the imager when the camera is exposed to extreme temperatures. By positioning the stanchions at the rear camera housing, the stanchions effectively increase the effects of the higher CTE camera structure movement to optimize focus of the lens at the imager over large temperature ranges.

Thus, when the camera is disposed at the vehicle, the very low CTE stanchions help to maintain focus of the lens assembly at the imager (so that images imaged by the lens are focused at the image plane of the imager throughout a range of temperatures to which the camera is exposed). The stanchions are sized and the material selected to limit or reduce (or increase) the movement of the circuit board when the camera is exposed to high temperatures (such as, for example, temperatures greater than 40 degrees C. or greater than 60 degrees C. or greater than 80 degrees C., such as 85 degrees C.), and/or low temperatures (such as, for example, temperatures below freezing, such as temperatures below 0 degrees C. or below −20 degrees C. or below −40 degrees C.). It is envisioned that aspects of the present invention may be applied to other types of high precision sensors, such as Lidar or magnetic sensors or the like.

The camera housing portions may be formed and the housing and printed circuit board and lens assembly and lens barrel may be tested to determine the effects of temperature on the construction. If it is determined that reduced temperature-induced movement of the printed circuit board is desired to maintain focus and alignment of the lens and imager, then the stanchions may be provided at the front camera housing portion to mount the printed circuit board at the front camera housing portion at the appropriate distance from the lens. If it is determined that increased temperature-induced movement of the printed circuit board is desired to maintain focus and alignment of the lens and imager, then the stanchions may be provided at the rear camera housing portion to mount the printed circuit board at the rear camera housing portion at the appropriate distance from the lens. The length and location of the stanchions are selected to provide the desired mounting structure for holding the printed circuit board relative to the lens and maintaining focus and alignment when the camera is exposed to extreme temperatures.

The camera assembly or module may otherwise comprise any suitable construction for controlling or accommodating changes in the camera when the camera is exposed to extreme temperatures, such as below −20 degrees C. or below −40 degrees C. and/or above 60 degrees C. or above 80 degrees C., and may utilize aspects of the cameras described in U.S. Publication Nos. US-2020-0033549; US-2020-0154020; US-2020-0137926; US-2020-0001787; US-2019-0306966; US-2019-0121051; US-2019-0124243 and/or US-2019-0124238, which are all hereby incorporated herein by reference in their entireties.

The camera assembly or module may utilize aspects of the cameras and connectors described in U.S. Pat. Nos. 10,272,857; 10,250,004; 10,230,875; 10,142,532; 9,621,769; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0129419; US-2017-0133811; US-2017-0201661; US-2017-0280034; US-2017-0295306 and/or US-2018-0098033, which are hereby incorporated herein by reference in their entireties.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Aspects of the camera(s) may be suitable for use on other sensors of the vehicle system, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077;

7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera comprising:
a camera housing comprising a front camera housing portion and a rear camera housing portion;
a printed circuit board having a first side and a second side opposite the first side and separated from the first side by a thickness dimension of the printed circuit board;
an imager disposed at the first side of the printed circuit board;
a lens assembly disposed at the front camera housing portion, the lens assembly accommodating at least one lens;
wherein the front camera housing portion is formed of a material having a first Coefficient of Thermal Expansion (CTE);
at least two attachment elements disposed at the front camera housing portion, the at least two attachment elements are formed of a material having a second CTE;
wherein the second CTE of the material of the at least two attachment elements is less than the first CTE of the material of the front camera housing portion, and wherein the second CTE of the material of the at least two attachment elements is less than 10 ppm/° C.;
wherein the printed circuit board is mounted at the at least two attachment elements disposed at the front camera housing portion via fasteners threadedly engaging respective ones of the at least two attachment elements;
wherein the front camera housing portion and the at least two attachment elements cooperate to decrease temperature-induced movement of the printed circuit board relative to the at least one lens; and
wherein, with the printed circuit board mounted at the at least two attachment elements via the respective fasteners, the front camera housing portion and the rear camera housing portion are mated together to encase the printed circuit board in the camera housing.

2. The vehicular camera of claim 1, wherein the at least two attachment elements comprise at least three attachment elements.

3. The vehicular camera of claim 2, wherein at least one other of the at least three attachment elements is not threadedly engaged with a fastener.

4. The vehicular camera of claim 1, wherein the material of the at least two attachment elements comprises Invar.

5. The vehicular camera of claim 1, wherein the second CTE of the material of the at least two attachment elements is less than 5 ppm/° C.

6. The vehicular camera of claim 1, wherein the second CTE of the material of the at least two attachment elements is less than 2 ppm/° C.

7. The vehicular camera of claim 1, wherein the printed circuit board is spaced from the lens assembly via a portion of the front camera housing portion and via the at least two attachment elements disposed at the front camera housing portion.

8. The vehicular camera of claim 1, wherein each attachment element of the at least two attachment elements comprises a post that protrudes from the front camera housing portion.

9. The vehicular camera of claim 1, wherein the at least two attachment elements allow for a decreased length of a support portion of the front camera housing portion at which the at least two attachment elements are disposed to decrease the temperature-induced movement of the printed circuit board relative to the at least one lens.

10. The vehicular camera of claim 1, wherein the lens assembly is attached at the front camera housing portion at a lens attachment region, and wherein the printed circuit board is spaced from the lens attachment region via a support portion of the front camera housing portion and via the at least two attachment elements, and wherein the support portion of the front camera housing portion spans between the lens attachment region and the at least two attachment elements.

11. A vehicular camera comprising:
a camera housing comprising a front camera housing portion and a rear camera housing portion;
a printed circuit board having a first side and a second side opposite the first side and separated from the first side by a thickness dimension of the printed circuit board;
an imager disposed at the first side of the printed circuit board;
a lens assembly disposed at the front camera housing portion, the lens assembly accommodating at least one lens;
wherein the front camera housing portion is formed of a material having a first Coefficient of Thermal Expansion (CTE);
at least two attachment elements disposed at the front camera housing portion, the at least two attachment elements are formed of a material having a second CTE;
wherein the second CTE of the material of the at least two attachment elements is less than the first CTE of the material of the front camera housing portion, and wherein the second CTE of the material of the at least two attachment elements is less than 10 ppm/° C.;
wherein the printed circuit board is mounted at the at least two attachment elements disposed at the front camera housing portion via fasteners threadedly engaging respective ones of the at least two attachment elements;
wherein each attachment element of the at least two attachment elements comprises a post that protrudes from the front camera housing portion;
wherein the printed circuit board is spaced from the lens assembly via a portion of the front camera housing portion and via the at least two attachment elements disposed at the front camera housing portion;
wherein the front camera housing portion and the at least two attachment elements cooperate to decrease temperature-induced movement of the printed circuit board relative to the at least one lens; and
wherein, with the printed circuit board mounted at the at least two attachment elements via the respective fasteners, the front camera housing portion and the rear camera housing portion are mated together to encase the printed circuit board in the camera housing.

12. The vehicular camera of claim 11, wherein the second CTE of the material of the at least two attachment elements is less than 5 ppm/° C.

13. The vehicular camera of claim 11, wherein the second CTE of the material of the at least two attachment elements is less than 2 ppm/° C.

14. The vehicular camera of claim 11, wherein the at least two attachment elements allow for a decreased length of a support portion of the front camera housing portion at which the at least two attachment elements are disposed to decrease the temperature-induced movement of the printed circuit board relative to the at least one lens.

15. The vehicular camera of claim 11, wherein the lens assembly is attached at the front camera housing portion at a lens attachment region, and wherein the printed circuit board is spaced from the lens attachment region via the portion of the front camera housing portion and via the at least two attachment elements, and wherein the portion of the front camera housing portion spans between the lens attachment region and the at least two attachment elements.

16. A vehicular camera comprising:
 a camera housing comprising a front camera housing portion and a rear camera housing portion;
 a printed circuit board having a first side and a second side opposite the first side and separated from the first side by a thickness dimension of the printed circuit board;
 an imager disposed at the first side of the printed circuit board;
 a lens assembly disposed at the front camera housing portion, the lens assembly accommodating at least one lens;
 wherein the lens assembly is attached at a lens attachment region at an outer side of the front camera housing portion;
 wherein the front camera housing portion is formed of a material having a first Coefficient of Thermal Expansion (CTE);
 at least two attachment elements disposed at an inner side of the front camera housing portion opposite the outer side of the front camera housing portion, the at least two attachment elements are formed of a material having a second CTE;
 wherein the second CTE of the material of the at least two attachment elements is less than the first CTE of the material of the front camera housing portion, and wherein the second CTE of the material of the at least two attachment elements is less than 10 ppm/° C.;
 wherein support structure of the front camera housing portion spans between the lens attachment region and the at least two attachment elements;
 wherein the at least two attachment elements are spaced from the lens attachment region of the front camera housing portion by the support structure of the front camera housing portion;
 wherein the printed circuit board is mounted at the at least two attachment elements disposed at the inner side of the front camera housing portion via fasteners threadedly engaging respective ones of the at least two attachment elements;
 wherein the support structure of the front camera housing portion and the at least two attachment elements cooperate to decrease temperature-induced movement of the printed circuit board relative to the at least one lens; and
 wherein, with the printed circuit board mounted at the at least two attachment elements via the respective fasteners, the front camera housing portion and the rear camera housing portion are mated together to encase the printed circuit board in the camera housing.

17. The vehicular camera of claim 16, wherein the at least two attachment elements comprise at least three attachment elements.

18. The vehicular camera of claim 17, wherein at least one other of the at least three attachment elements is not threadedly engaged with a fastener.

19. The vehicular camera of claim 16, wherein the second CTE of the material of the at least two attachment elements is less than 5 ppm/° C.

20. The vehicular camera of claim 16, wherein the second CTE of the material of the at least two attachment elements is less than 2 ppm/° C.

21. The vehicular camera of claim 16, wherein each attachment element of the at least two attachment elements comprises a post that protrudes from the front camera housing portion.

22. The vehicular camera of claim 16, wherein the at least two attachment elements allow for a decreased length of the support structure of the front camera housing portion to decrease the temperature-induced movement of the printed circuit board relative to the at least one lens.

* * * * *